United States Patent
Hiroe et al.

(10) Patent No.: US 11,300,058 B2
(45) Date of Patent: Apr. 12, 2022

(54) SIGNAL PROCESSING APPARATUS, TURBINE SYSTEM, SIGNAL PROCESSING METHOD, AND PROGRAM

(71) Applicant: MITSUBISHI HEAVY INDUSTRIES, LTD., Tokyo (JP)

(72) Inventors: Takaharu Hiroe, Tokyo (JP); Tadashi Murata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 727 days.

(21) Appl. No.: 15/982,087

(22) Filed: May 17, 2018

(65) Prior Publication Data

US 2018/0334967 A1   Nov. 22, 2018

(30) Foreign Application Priority Data

May 18, 2017   (JP) .............................. JP2017-098825

(51) Int. Cl.
*F02C 9/28* (2006.01)
*G06F 17/18* (2006.01)
*H04L 1/00* (2006.01)
*G05B 13/04* (2006.01)

(52) U.S. Cl.
CPC ................ *F02C 9/28* (2013.01); *G05B 13/04* (2013.01); *G06F 17/18* (2013.01); *H04L 1/00* (2013.01); *F05D 2270/333* (2013.01)

(58) Field of Classification Search
None
See application file for complete search history.

(56) References Cited

U.S. PATENT DOCUMENTS

2016/0123232 A1* 5/2016 Wright ..................... F02C 7/22
                                                           60/778

FOREIGN PATENT DOCUMENTS

JP         63073156 A     4/1988
JP         5070591 B     11/2012

OTHER PUBLICATIONS

Kalman filter—Wikipedia, the free encyclopedia (Year: 2016).*

* cited by examiner

*Primary Examiner* — Arun Goyal
*Assistant Examiner* — William L Breazeal
(74) *Attorney, Agent, or Firm* — Kanesaka Berner and Partners LLP

(57) ABSTRACT

A signal processing apparatus includes a CPU which executes an input step of receiving an input of a measurement value of a target parameter at a first time, in which noise is superimposed on a true value of the target parameter, a calculation step of calculating a variation amount of the measurement value of the target parameter at the first time, based on a maximum likelihood estimate of the target parameter at a second time and calculating a maximum likelihood estimate of the variation amount, and an output step of outputting a value obtained by adding the maximum likelihood estimate of the variation amount to the maximum likelihood estimate of the target parameter at the second time, as a maximum likelihood estimate of the target parameter at the first time.

7 Claims, 6 Drawing Sheets

SIGNAL PROCESSING APPARATUS, TURBINE SYSTEM, SIGNAL PROCESSING METHOD, AND PROGRAM

RELATED APPLICATIONS

The present application claims priority of Japanese Application Number 2017-098825 filed May 18, 2017, the disclosure of which is hereby incorporated by reference herein in its entirety.

BACKGROUND OF THE INVENTION

Field of the Invention

The present disclosure relates to a signal processing apparatus, a turbine system, a signal processing method, and a program.

Description of Related Art

Noise is superimposed on a measurement signal used for control or diagnosis and monitoring. The noise is a hindrance to improvement in accuracy of control or diagnosis and monitoring. When variation of the measurement signal is large, it is important to distinguish whether the variation is due only to noise or due to a fluctuation of a true value of a plant or machine.

If a control operation is taken by regarding noise as a variation of the true value, there is unnecessary disturbance in a plant or a machine device, and economic losses such as production of defective products and wear and tear in a plant or machine occur. In contrast, if suitable control operation is not performed due to regarding variation in the true value of a plant or machine as noise, economic losses occur such as the production of defective products and wear and tear in a plant or machine deviating from a stable operation state.

A common unit used for distinguishing between these is a filter such as a first-order lag filter. As a general characteristic, noise in a measurement appears in a high frequency region and a true response in a plant or machine appears in a low frequency region. Using this characteristic, a measurement signal is passed to a filter for cutting off high frequency components such as a first-order lag, and noise is removed. In this method, there is no problem as long as frequency characteristics are steady, that is, "noise is mainly included in high frequency components and the true value is mainly included in low frequency components". However, when the true value of a plant suddenly varies stepwise, and the like, that is, when high frequency components are included in true values, the frequency characteristics described above do not apply, and a response to variation in a true value may be delayed. This can also cause economic losses such as production of defective products and wear and tear in a plant. As a result, it can be said that a filter such as a first-order lag filter is not sufficient.

As a measure in response to these problems, for example, Japanese Patent No. 5070591 proposes a method of removing non-steady noise using a particle filter, an extended Kalman filter, or the like.

In the invention disclosed in Japanese Patent No. 5070591, a calculation load such as that for a particle filter, an extended Kalman filter, or the like is large, realization in an inexpensive control device is difficult.

SUMMARY OF THE INVENTION

According to the present disclosure, a signal processing apparatus, a turbine system, a signal processing method, and a program which can reduce a calculation load for removing noise are provided.

According to one aspect of the embodiment, a signal processing apparatus includes a CPU which executes an input step of receiving an input of a measurement value of a target parameter at a first time, in which noise is superimposed on a true value of the target parameter, a calculation step of calculating a variation amount of the measurement value of the target parameter at the first time, based on a maximum likelihood estimate of the target parameter at a second time, which is before the first time, by subtracting the maximum likelihood estimate of the target parameter at the second time from the measurement value of the target parameter, and calculating a maximum likelihood estimate of the variation amount by multiplying the variation amount by a coefficient, which is based on a dispersion of the true value of the target parameter and a dispersion of the noise, and an output step of outputting a value obtained by adding the maximum likelihood estimate of the variation amount to the maximum likelihood estimate of the target parameter at the second time, as a maximum likelihood estimate of the target parameter at the first time. Thus, the CPU is configured to obtain the dispersion of the true value on the basis of a product of a predetermined first adjustment coefficient and the variation amount in the calculation step.

In addition, according to one aspect of the embodiment, in the signal processing apparatus described above, the CPU may further execute a simulated signal output step of outputting a simulated signal prepared in advance to simulate a behavior of the true value of the target parameter. The CPU, in the calculation step, is configured to calculate a measurement value of a simulated variation amount by adding a variation amount of the noise to a variation amount of the simulated signal, calculate a maximum likelihood estimate of the simulated variation amount by multiplying the measurement value of the simulated variation amount by a coefficient based on a dispersion of the variation amount of the simulated signal and a dispersion of the variation amount of the noise, and calculate an error between the variation amount of the simulated signal and the maximum likelihood estimate of the simulated variation amount. In addition, the dispersion of the variation amount of the simulated signal is obtained on the basis of a product of a predetermined second adjustment coefficient and the measurement value of the simulated variation amount, and a second adjustment coefficient with which the error becomes a minimum is specified among a plurality of second adjustment coefficients, and the specified second adjustment coefficient is substituted for the first adjustment coefficient.

In addition, according to one aspect of the embodiment, the CPU may calculate a measurement value of a simulated variation amount by regarding the variation amount of the measurement value of the target parameter as the variation amount of the noise in the calculation step.

In addition, according to one aspect of the embodiment, the CPU may input the measurement value measured by a sensor installed in a device to be controlled in the input step.

In addition, according to one aspect of the embodiment, the CPU may further execute a control step of controlling a device to be controlled on the basis of the maximum likelihood estimate of the target parameter.

In addition, according to one aspect of the embodiment, a turbine system includes the signal processing apparatus described above and a turbine device, in which the signal processing apparatus is configured to control the turbine device on the basis of the maximum likelihood estimate of the target parameter at the first time.

Moreover, according to another aspect of the embodiment, a signal processing method includes an input step of receiving an input of a measurement value of a target parameter at a first time, in which noise is superimposed on a true value of the target parameter, a step of calculating a variation amount of the measurement value of the target parameter at the first time, based on a maximum likelihood estimate of the target parameter at a second time, which is before the first time, by subtracting the maximum likelihood estimate of the target parameter at the second time from the measurement value of the target parameter, a step of calculating a maximum likelihood estimate of the variation amount by multiplying the variation amount by a coefficient, which is based on a dispersion of the true value of the target parameter and a dispersion of the noise, and an output step of outputting a value obtained by adding the maximum likelihood estimate of the variation amount to the maximum likelihood estimate of the target parameter at the second time, as a maximum likelihood estimate of the target parameter at the first time. Thus, the dispersion of the true value is obtained on the basis of a product of a predetermined first adjustment coefficient and the variation amount in the step of calculating a maximum likelihood estimate of the variation amount.

In addition, according to still another aspect of the embodiment, a non-transitory computer readable medium stores a program causing a computer to execute an input step of receiving an input of a measurement value of a target parameter at a first time, in which noise is superimposed on a true value of the target parameter, a step of calculating a variation amount of the measurement value of the target parameter at the first time, based on a maximum likelihood estimate of the target parameter at a second time, which is before the first time, by subtracting the maximum likelihood estimate of the target parameter at the second time from the measurement value of the target parameter, a step of calculating a maximum likelihood estimate of the variation amount by multiplying the variation amount by a coefficient, which is based on a dispersion of the true value of the target parameter and a dispersion of the noise, and an output step of outputting a value obtained by adding the maximum likelihood estimate of the variation amount to the maximum likelihood estimate of the target parameter at the second time, as a maximum likelihood estimate of the target parameter at the first time. Thus, the dispersion of the true value is obtained on the basis of a product of a predetermined first adjustment coefficient and the variation amount in the step of calculating a maximum likelihood estimate of the variation amount.

According to one aspect of the embodiments described above, it is possible to reduce a calculation load for removing noise.

DETAILED DESCRIPTION OF THE INVENTION

First Embodiment

Hereinafter, a turbine system and a control device according to a first embodiment of the present invention will be described in detail with reference to the drawings.

(Overall Configuration of a Turbine System)

Figure 1:
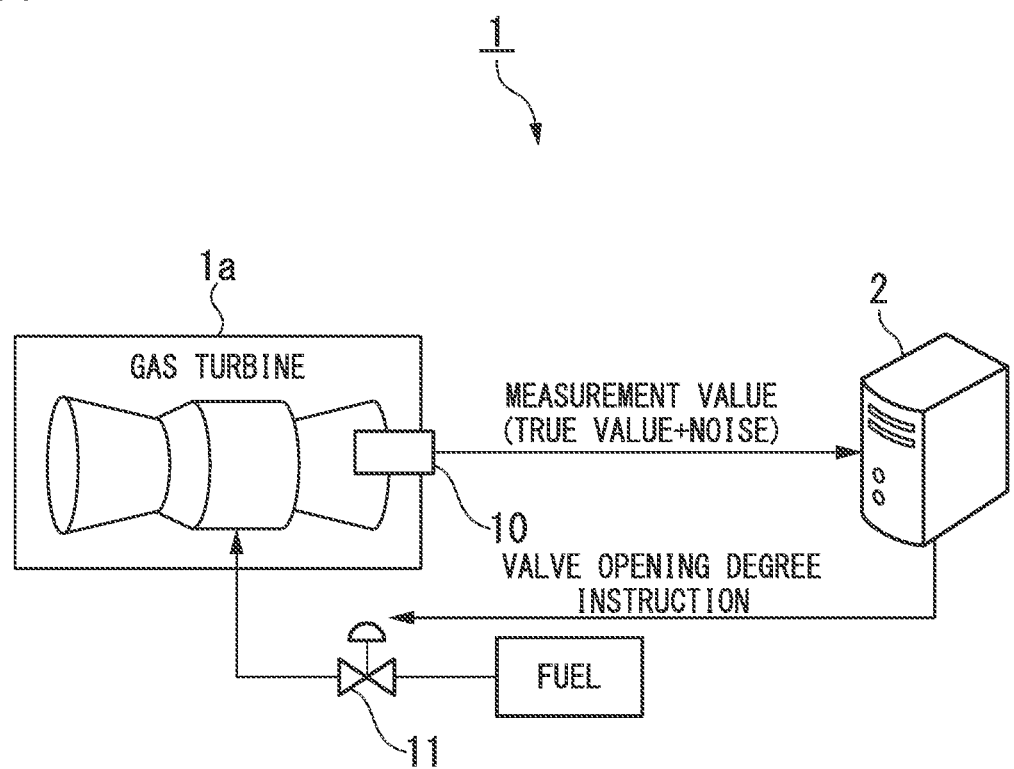
FIG. 1 is a diagram which shows an overall configuration of a turbine system according to a first embodiment.

FIG. 1 is a diagram which shows an overall configuration of a turbine system according to the first embodiment.

A turbine system 1 is, for example, a facility which is installed in a power generation plant and generates power from electric power (rotation power) applied to a turbine device.

As shown in FIG. 1, the turbine system 1 includes a gas turbine 1*a* (turbine device) and a control device 2.

The gas turbine 1*a* is a rotation machine which obtains rotational kinetic energy using high temperature gas generated by combustion of fuel and the like, and an operation thereof is controlled by a control device 2. The gas turbine 1*a* has sensors 10 at various positions, and can acquire parameters such as a temperature, a pressure, a flow rate, and the like at respective positions on the gas turbine 1*a* using the sensors 10.

The control device 2 monitors and controls the gas turbine 1*a* by acquiring measurement values of various parameters from the gas turbine 1*a* to be controlled. The control device 2 acquires a measurement value of a target parameter to be observed (for example, a combustor outlet temperature) through a sensor 10 provided in the gas turbine 1*a*. This measurement value is acquired in a state in which a predetermined amount of noise (noise) is superimposed on a true value of the target parameter. The control device 2 according to the present embodiment has a function as a signal processing apparatus which selectively removes only the noise from the input measurement values and outputs a maximum likelihood estimate of the true value of the target parameter (a plausible value as the true value).

In addition, the control device 2 controls the gas turbine 1*a* on the basis of a maximum likelihood estimate of the true value of a target parameter. Specifically, the control device 2 outputs a valve opening degree instruction to an on-off valve 11 provided in, for example, a fuel supply path of the gas turbine 1*a*, and performs control to increase or decrease an amount of fuel supplied to the gas turbine 1*a*.

(Functional Configuration of a Control Device)

Figure 2A:
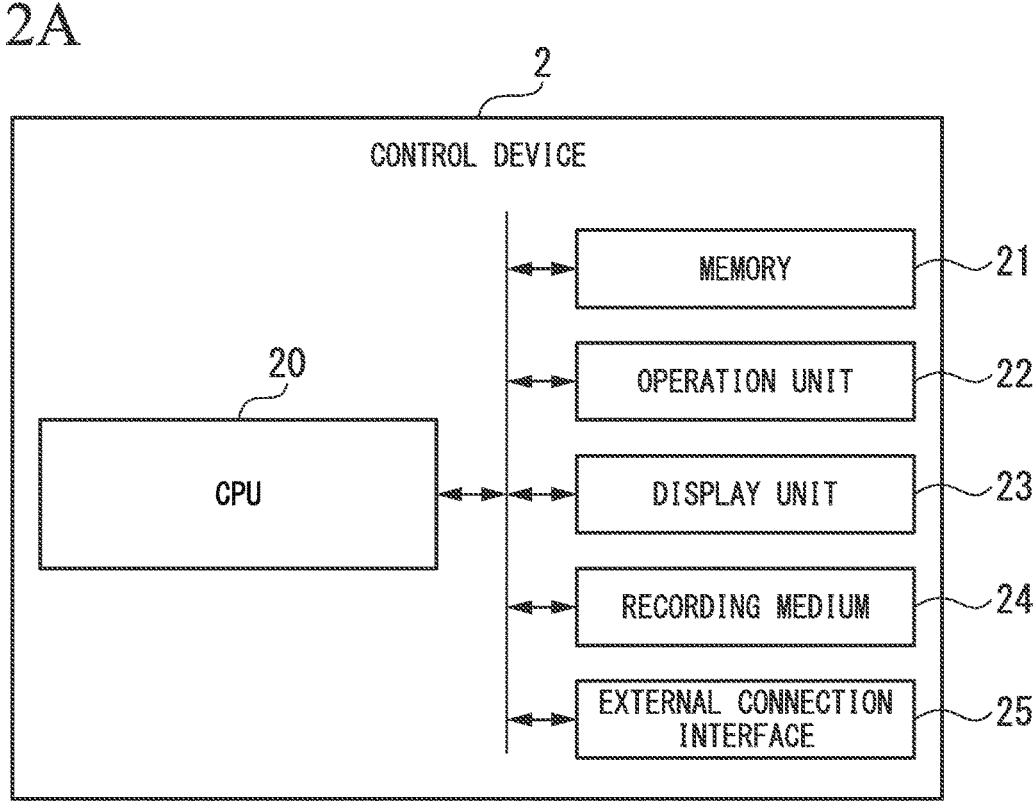
FIG. 2A is a first diagram which shows a functional configuration of a control device according to the first embodiment.

FIG. 2A is a first diagram which shows a functional configuration of the control device according to the first embodiment.

Figure 2B:
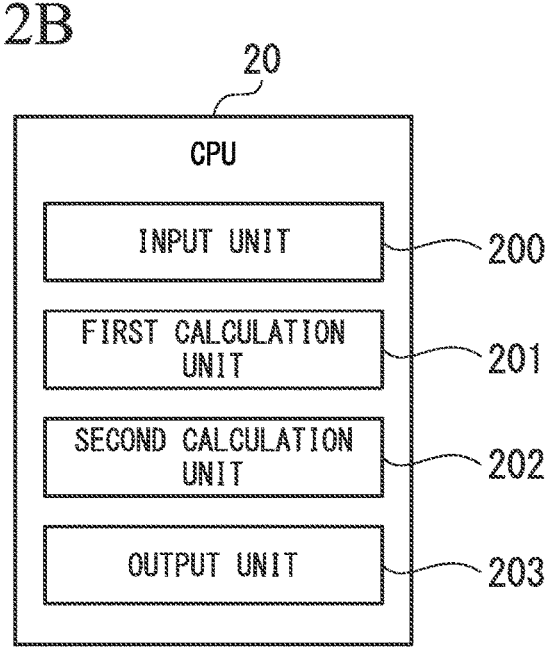
FIG. 2B is a second diagram which shows the functional configuration of a control device according to the first embodiment.

FIG. 2B is a second diagram which shows the functional configuration of the control device according to the first embodiment.

FIG. 2A shows a hardware configuration of the control device 2, and FIG. 2B shows a software configuration of the control device 2 (CPU 20).

As shown in FIG. 2A, the control device 2 includes the CPU 20, a memory 21, an operation unit 22, a display unit 23, a recording medium 24, and an external connection interface 25.

The CPU 20 is a calculation device which realizes each function to be described below by reading a program or data stored in the recording medium 24 and the like onto the memory 21, and executing processing.

The memory 21 is a volatile memory (RAM) used as a work area and the like of the CPU 20.

The operation unit 22 is constituted by, for example, a mouse, a touch panel, a keyboard, and the like, and inputs various types of operations and the like to the CPU 20 in response to an instruction of an operator (a user).

The display unit 23 is realized by, for example, a liquid crystal display, an organic EL display, or the like, and displays results of the processing executed by the CPU 20.

The recording medium 24 is realized by a large capacity recording device such as a Hard Disk Drive (HDD), a Solid State Drive (SSD), or the like, and stores an operation system (OS), an application program, various types of data, and the like.

The external connection interface 25 is an interface with an external device. In particular, the external connection interface 25 is connected to a sensor disposed at respective positions of the turbine device 1a in the present embodiment.

The CPU 20 according to the first embodiment functions as the input unit 200, the first calculation unit 201, the second calculation unit 202, and the output unit 203 shown in FIG. 2B by operating on the basis of the program described above. The first calculation unit 201 and the second calculation unit 202 may be realized as one calculation unit.

The input unit 200 inputs a measurement value (y) of a target parameter (for example, a combustor outlet temperature) through the sensor 10 provided in the gas turbine 1a. As described above, noise (w) is superimposed on a true value ($y_0$) of the target parameter in this measurement value (y). The control device 2 cannot directly observe the true value ($y_0$), and can only estimate the true value ($y_0$) from the measurement value (y) in which the noise (w) is incorporated.

The first calculation unit 201 calculates the variation amount measurement value ($\Delta y^t$) at a time t by subtracting a previous maximum likelihood estimate ($*y_0^{t-1}$) of the target parameter from a measurement value ($y^t$) of the target parameter input at the time t (a first time) using the input unit 200. Here, the variation amount measurement value ($\Delta y^t$) at the time t is a variation amount of the measurement value ($y^t$) of the target parameter at the time t (the first time) based on a maximum likelihood estimate of the target parameter at a time t−1 (a second time) (the previous maximum likelihood estimate ($*y_0^{t-1}$)).

The second calculation unit 202 calculates a maximum likelihood estimate ($*\Delta y_0^t$) of a variation amount at the time t by multiplying the variation amount measurement value ($\Delta y^t$) calculated by the first calculation unit 201 by a coefficient (an estimation coefficient α to be described below), which is based on a dispersion ($\sigma_{y0}^2$) of the true value of the target parameter and a dispersion ($\sigma_w^2$) of noise. As described below, the second calculation unit 202 determines the dispersion ($\sigma_{y0}^2$) of the true value on the basis of a result of calculating a product of a predetermined first adjustment coefficient (κ) and the variation amount measurement value ($\Delta y^t$). Here, the maximum likelihood estimate ($*\Delta y_0^t$) of a variation amount at the time t is a maximum likelihood estimate of the variation amount (the variation amount measurement value ($\Delta y^t$)) of the measurement value ($y^t$) of the target parameter at the time t (the first time) based on the previous maximum likelihood estimate (the previous maximum likelihood estimate ($*y_0^{t-1}$)) of the target parameter at the time t−1 (the second time).

The output unit 203 calculates and outputs a current maximum likelihood estimate ($*y_0^t$) which is a maximum likelihood estimate of the target parameter at the time t (the first time) by adding the maximum likelihood estimate ($*\Delta y_0^t$) of a variation amount calculated by the second calculation unit 202 to the previous maximum likelihood estimate ($*y_0^{t-1}$) which is the maximum likelihood estimate of the target parameter at the time t−1 (the second time) of the target parameter. In addition, the CPU 20 calculates an opening degree of the on-off valve 11 such that a fuel supply amount to the gas turbine 1a becomes an amount in accordance with the current maximum likelihood estimate ($*y_0^t$) output from the output unit 203, and outputs the calculated opening degree to the on-off valve 11 as a valve opening degree instruction.

Notations of "*y" and "*Δy" in the specification correspond to a notification in which a hat sign "^" is attached to "y" in Figures and Equations shown below. In the same manner, a notation of "*w" in the specification corresponds to a notification in which the hat sign "^" is attached to "w" in the Figures and Equations shown below.

(Processing Flow of Control Device)

Figure 3:
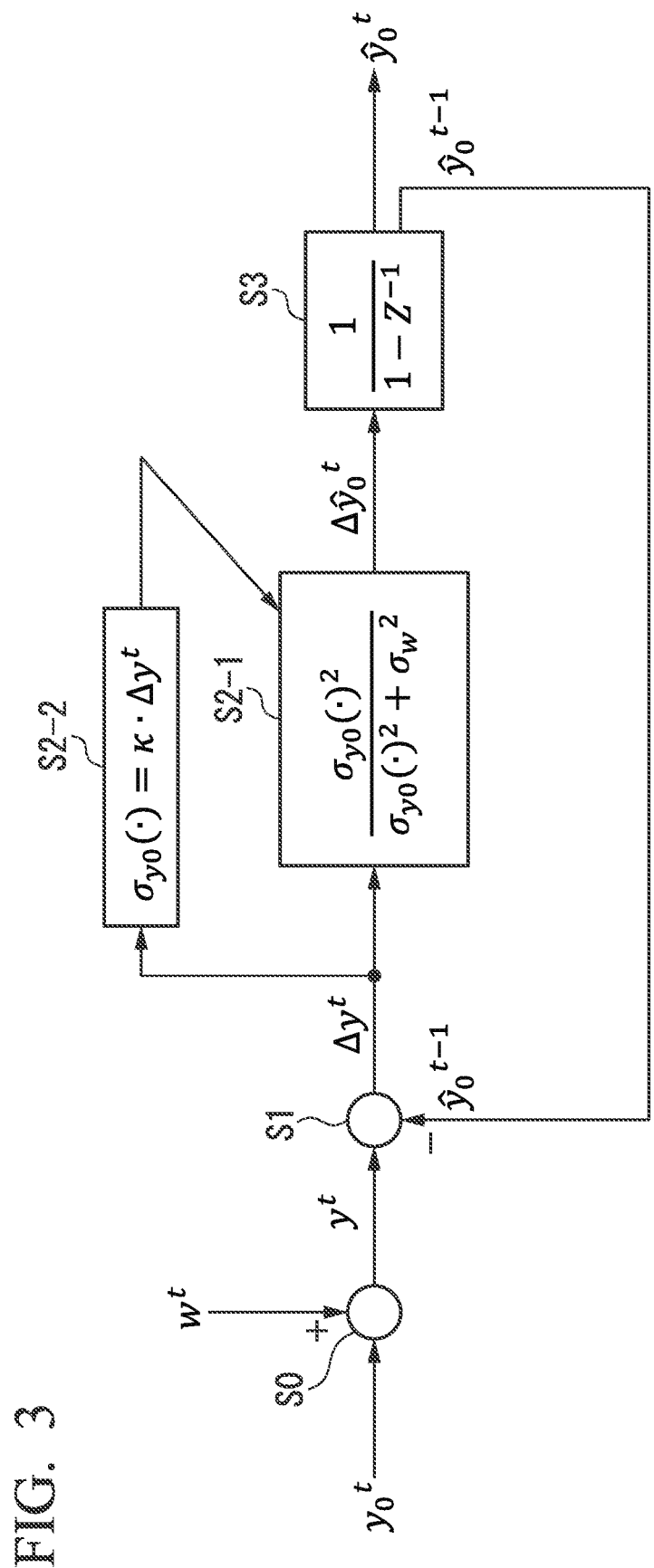
FIG. 3 is a diagram which shows a processing flow of the control device according to the first embodiment.

FIG. 3 is a diagram which shows a processing flow of the control device according to the first embodiment.

The processing flow shown in FIG. 3 is regularly executed in a repetitive manner while the turbine system 1 operates.

First, the input unit 200 of the control device 2 inputs the measurement value ($y^t$) of the target parameter (combustor outlet temperature) through the sensor 10 attached to the gas turbine 1a at a current time (the time t). Here, the measurement value ($y^t$) of the target parameter is obtained by adding a noise ($w^t$) at the same time (an unknown value) to the true value ($y_0^t$) of the target parameter at the time t (an unknown value) (step S0). The control device 2 performs predetermined signal processing shown in the following steps on the measurement value ($y^t$) including the noise ($w^t$), and outputs the maximum likelihood estimate ($*y_0^t$) of the true value ($y_0^t$).

Next, the first calculation unit 201 of the control device 2 calculates the variation amount measurement value ($\Delta y^t$) at the time t by subtracting the previous maximum likelihood estimate ($*y_0^{t-1}$) of the target parameter from the measurement value ($y^t$) of the target parameter input at the time t (step S1). Here, the previous maximum likelihood estimate ($*y_0^{t-1}$) is the maximum likelihood estimate of the target parameter at the time t−1 immediately before the time t (that is, the maximum likelihood estimate of the true value ($y_0^{t-1}$) of the target parameter).

In addition, since the variation amount measurement value ($\Delta y^t$) is obtained by subtracting the previous maximum likelihood estimate ($*y_0^{t-1}$) from the measurement value ($y^t$) of the target parameter ($\Delta y^t = y^t - *y_0^{t-1}$), this variation amount measurement value ($\Delta y^t$) can be regarded as a value obtained by superimposing the noise ($w^t$) occurring at the time t on the variation amount of the true value ($\Delta y_0$) occurring from the time t−1 to the time t ($\Delta y_0$ and $w^t$ are both unknown).

Next, the second calculation unit 202 of the control device 2 calculates the maximum likelihood estimate ($*\Delta y_0^t$) of a variation amount at the time t by multiplying the variation amount measurement value ($\Delta y^t$) calculated in step S1 by the predetermined estimation coefficient α (to be described) (step S2-1). Here, the maximum likelihood estimate ($*\Delta y_0^t$) of a variation amount is a maximum likelihood estimate of the variation amount ($\Delta y_0^t$) of the true value occurring from the time t−1 to the time t.

The estimation coefficient α in step S2-1 is shown as in Equation (1) on the basis of the dispersion ($\sigma_{y0}^2$) of the true value of the target parameter and the dispersion ($\sigma_w^2$) of noise.

$$\alpha = \frac{\sigma_{y0}^2}{\sigma_{y0}^2 + \sigma_w^2} \qquad (1)$$

Here, the reason why the maximum likelihood estimate ($*\Delta y_0^t$) of a variation amount is obtained by multiplying the variation amount measured value ($\Delta y^t$) calculated in step S1 by the estimation coefficient α (Equation 1) will be described.

When the measurement value (y) of the target parameter is measured, a probability $p(y_0|y)$ that the measurement value (y) is the true value ($y_0$) is as shown in Equation (2).

$$p(y_0 | y) = p(y | y_0)p(y_0)/p(y) \qquad (2)$$

$$= \frac{1}{2\pi\sigma_{y0}\sigma_w} e^{\frac{w^2}{2\sigma_w^2} \frac{(y-w)^2}{2\sigma_{y0}^2}} \Big/ p(y)$$

Regarding Equation (2), it is known that the noise (w) can be approximated by a normal distribution of $N(0,\sigma_w)$, and a standard deviation $\sigma_w$ of noise (dispersion $\sigma_w^2$) can be assumed to be known due to previous measurement thereof and the like. However, the true value of the target parameter is also approximated by a normal distribution of $N(\mu_{y0},\sigma_{y0})$, but an average $\mu_{y0}$ and a standard deviation $\sigma_{y0}$ are unknown (actually, the accuracy in approximation using the normal distribution is unknown). In addition, since acquisition of the measurement value (y) of the target parameter has been completed, "p(y)" (a probability that the measurement value (y) is acquired) in Equation (2) is a constant.

The noise (w) which maximizes the probability $p(y_0|y)$ is a maximum likelihood estimate of noise ($*w$). Since it is clear that the probability $p(y_0|y)$ is convex upward with respect to the noise (w) based on Equation (2), a value of noise which makes an equation in which the probability $p(y_0|y)$ is differentiated with respect to the noise (w) zero is the maximum likelihood estimate of noise ($*w$). That is, the maximum likelihood estimate of noise ($*w$) is obtained by Equation (3).

$$\hat{w} = \frac{\sigma_w^2}{\sigma_{y0}^2 + \sigma_w^2} \cdot y \qquad (3)$$

According to Equation (3), the maximum likelihood estimate ($*y_0$) of the true value ($y_0$) of the target parameter is obtained as shown in Equation (4) by subtracting the maximum likelihood estimate ($*w$) of noise from the measurement value (y).

$$\hat{y}_0 = \frac{\sigma_{y0}^2}{\sigma_{y0}^2 + \sigma_w^2} \cdot y \qquad (4)$$

Here, if it is assumed that each of the true value ($y_0$) of the target parameter and the noise (w) only have autocorrelation (the same intensity at all frequencies like white noise), Equation (4) is also established for a difference (the variation amount ($\Delta y_0$) between a previous value (a value at the time t−1) and a current value (a value at the time t) of the true value ($y_0$) in the same manner. That is, Equation (5) shown in the following is established.

$$\Delta \hat{y}_0 = \frac{2\sigma_{y0}^2}{2\sigma_{y0}^2 + 2\sigma_w^2} \cdot \Delta y \qquad (5)$$

$$= \frac{2\sigma_{y0}^2}{2\sigma_{y0}^2 + 2\sigma_w^2} \cdot (y^t - y_0^{t-1} - w^{t-1})$$

$$\approx \frac{\sigma_{y0}^2}{\sigma_{y0}^2 + \sigma_w^2} \cdot (y^t - \hat{y}_0^{t-1} - 0)$$

Since the previous true value ($y_0^{t-1}$) of the target parameter is unknown in the conversion from a second line to a third line in Equation (5), this approximates to the previous maximum likelihood estimate ($*y_0^{t-1}$). In addition, the previous noise ($w^{t-1}$) is set to zero by taking expected values of both sides.

Using Equation (5), it is possible to obtain the maximum likelihood estimate ($*\Delta y_0^t$) of a variation amount by multiplying the variation amount measurement ($\Delta y^t = y^t - *y_0^{t-1}$) by the estimation coefficient α (Equation 1). However, as described above, the dispersion ($\sigma_w^2$) of noise is known, but the dispersion ($\sigma_{y0}^2$) of the true value is not known. The dispersion ($\sigma_{y0}^2$) of the true value is obtained through the processing of step S2-2 described below.

The processing of step S2-2 is processing for obtaining a standard deviation ($\sigma_{y0}$) of the true value included the estimation coefficient α of step S2-1 by calculating a product of the first adjustment coefficient (κ) and the variation amount measurement value ($\Delta y$). The details of the processing will be described below but the processing of step S3 will be described first.

The output unit 203 of the control device 2 adds the maximum likelihood estimate ($*\Delta y_0^t$) of a variation amount calculated in step S2-1 to the previous maximum likelihood estimate ($*y_0^{t-1}$) of the target parameter, and outputs the current maximum likelihood estimate ($*y_0^t$) of the target parameter (step S3) ($*y_0^t = *y_0^{t-1} + *\Delta y_0^t$).

"$Z^{-1}$" is a delay operator of a Z-transform and ($1/(1-Z^{-1})$) represents a numerical integration in a time direction as a whole.

The control device 2 can obtain the maximum likelihood estimate ($*y_0^t$) of the true value ($y_0^t$) at the time t from the measurement value ($y^t$) of the target parameter to be observed at the time t through a processing flow of steps S1 to S3 above. That is, the control device 2 functions as a noise removal filter which receives the measurement value (y) including the noise (w) as an input and outputs the maximum likelihood estimate ($*y_0$) of the true value ($y_0$).

The CPU 20 according to the present embodiment controls the gas turbine 1a on the basis of a maximum likelihood estimate ($*y_0$) of the true value ($y_0$) output from the output unit 203. For example, an example in which a target parameter is a combustor outlet temperature will be described. The CPU 20 calculates the opening degree of the on-off valve 11 such that a fuel supply amount to the gas turbine 1a is lower when a maximum likelihood estimate of the combustor outlet temperature is higher than an assumed temperature by a predetermined temperature or more. On the other hand, the CPU 20 calculates the opening degree of the on-off valve 11 such that the fuel supply amount to the gas turbine 1a is higher when the maximum likelihood estimate of the combustor outlet temperature is lower than the assumed temperature by a predetermined temperature or more. Thus, the CPU 20 performs control to increase or decrease the fuel supply amount to the gas turbine 1a by outputting the calculated opening degree to the on-off valve 11 as a valve opening degree instruction.

Next, processing of step S2-2 will be described in detail. As a premise, the dispersion ($\sigma_w^2$) of noise is known, and the dispersion ($\sigma_{y0}^2$) of the true value of the target parameter is unknown.

Here, it is assumed that the true value ($y_0$) of the target parameter has significantly greater variation than the dispersion ($\sigma_w^2$) of noise at a certain time. In this case, most of the variation amount measurement value ($\Delta y$) acquired at the time is accounted for the variation amount ($\Delta y_0$) of the true value. That is, since a component accounted for the noise (w) in the variation amount measurement value ($\Delta y$) is relatively small, the variation amount measurement value ($\Delta y$) is regarded to be close to the maximum likelihood (*$\Delta y_0 = \Delta y$) of the variation amount ($\Delta y_0$) of the true value. This agrees with a result when the dispersion ($\sigma_{y0}^2$) of the true value is remarkably larger than the dispersion ($\sigma_w^2$) of noise ($\sigma_{y0}^2/\sigma_w^2 \to \infty$) in Equation (5).

In contrast, it may be assumed that the true value ($y_0$) of the target parameter varies remarkably smaller than the dispersion ($\sigma_w^2$) of noise at a certain time (that is, the true value hardly varies). In this case, most of the variation amount measurement value ($\Delta y$) acquired at the time is occupied by the noise (w). That is, since it can be assumed that the variation amount ($\Delta y_0$) of the true value is only a small component of the variation amount measurement value ($\Delta y$), the maximum likelihood of the variation amount ($\Delta y_0$) of the true value can be regarded as being close to "0" (*$\Delta y_0 = 0$). This coincides with a result when the dispersion ($\sigma_{y0}^2$) of the true value is remarkably smaller than the dispersion ($\sigma_w^2$) of noise ($\sigma_{y0}^2/\sigma_w^2 \to 0$) in Equation (5).

In other words, the maximum likelihood estimate (*$\Delta y_0$) of a variation amount when a variation amount measurement value ($\Delta y$) is measured can vary from "0" to "$\Delta y$" depending on a magnitude of the variation amount measurement value ($\Delta y$) when being compared with the dispersion ($\sigma_w^2$) of noise. Thus, change in the maximum likelihood estimate (*$\Delta y_0$) of a variation amount can be expressed by increasing or decreasing the dispersion ($\sigma_{y0}^2$) of the true value in Equation (5).

Therefore, the dispersion ($\sigma_{y0}^2$) of the true value which is an unknown value is determined to increase or decrease in accordance with the magnitude of the variation amount measurement value ($\Delta y$) in the present embodiment. That is, the second calculation unit 202 obtains the standard deviation ($\sigma_{y0}$) of the true value by calculating a product of the first adjustment coefficient (K) and the variation amount measurement value ($\Delta y$) ($\sigma_{y0}^t = \kappa \cdot \Delta y^t = \kappa \cdot (y^t - *y_0^{t-1})$). Here, the first adjustment coefficient ($\kappa$) is an integer defined in advance by previous setting (step S2-2).

(Action/Effects)

As described above, the control device 2 according to the first embodiment determines the standard deviation ($\sigma_{y0}$) of the true value according to "$\sigma_{y0} = \kappa \cdot \Delta y$." In this manner, as the maximum likelihood estimate (*$\Delta y_0$) of a variation amount becomes a value closer to the variation amount measurement value ($\Delta y$) itself as the variation amount measurement value ($\Delta y$) becomes larger, and the maximum likelihood estimate (*$\Delta y_0$) of a variation amount becomes a value closer to zero as the variation amount measurement value ($\Delta y$) becomes smaller.

Therefore, when there is rapid change or when there is hardly any change in the true value ($y_0$) of the target parameter, it is possible to appropriately calculate the maximum likelihood estimate (*$y_0$) of the target parameter. In addition, this calculation can be realized simply by calculation using an extremely simple arithmetic equation shown in steps S0 to S3 of FIG. 3, and thus it is possible to reduce a calculation load for removing noise.

As described above, it is possible to realize a noise removal filter with high noise removal accuracy and a small calculation load.

For example, when the target parameter is a combustor outlet temperature, this temperature measurement value is a sum of a true temperature and measurement noise. In the control of a turbine system, a true temperature is measured, that is, only noise is removed, and when the true temperature is higher than a set upper temperature limit, it is desirable to reduce a fuel supply to a combustor by determining to reduce a supply amount of fuel. As described above, noise has been removed by blocking a high frequency component of a measurement signal in conventional technologies. This is because variation in the noise depends on the natural phenomenon that it contains more high frequency components than the variation in the true temperature. When high frequency components are cut off using a filter, the true temperature mainly remains. However, when an abnormality occurs in a turbine, the true temperature varies steeply. At this time in a technology of blocking a high frequency component of the related art, since the high frequency component of the true temperature is also blocked by a filter, it is difficult to capture a steep variation of the true temperature. Specifically, it is assumed that the true temperature sharply increases stepwise due to some failures. At this time, if the true temperature is captured, a control device can immediately execute control to reduce the supply amount of fuel. However, for example, a filter ring based on a moving average which smoothes a measurement value in a time direction is used in conventional technologies. For this reason, the high frequency component which is a steep variation component is smoothed and removed, and thus it is difficult to capture a steep increase in the true temperature. As a result, in a turbine system having a conventional filter, thermal damage may occur due to a delay in response to a sharp increase in temperature.

However, the control device 2 according to the present embodiment does not excessively respond to a small change in temperature because the maximum likelihood estimate (*$\Delta y_0$) of a variation amount becomes a value closer to zero as the variation amount measurement value ($\Delta y$) is smaller. On the other hand, the control device 2 can promptly detect a steep variation in temperature because the maximum likelihood estimate (*$\Delta y_0$) of a variation amount becomes a value closer to the variation amount measurement value ($\Delta y$), that is, the true temperature itself, as the variation amount measurement value ($\Delta y$) is larger. Then, when such a rapid increase in temperature is detected, the control device 2 can reduce a fuel supply amount to the gas turbine 1a by controlling the opening degree of the on-off valve 11, and thus it is possible to prevent damage of the gas turbine 1a.

The first adjustment coefficient ($\kappa$) according to the first embodiment, for example, may be appropriately determined from a relationship (a degree of noise removal, a degree of distortion of a waveform, and the like) between an input signal (true value+noise) and an output signal (maximum likelihood estimate) while evaluating it. However, the present invention is not limited to this mode in other embodiments.

Second Embodiment

Next, a turbine system and a control device according to a second embodiment of the present invention will be described in detail with reference to drawings.

(Functional Configuration of Control Device)

Figure 4:
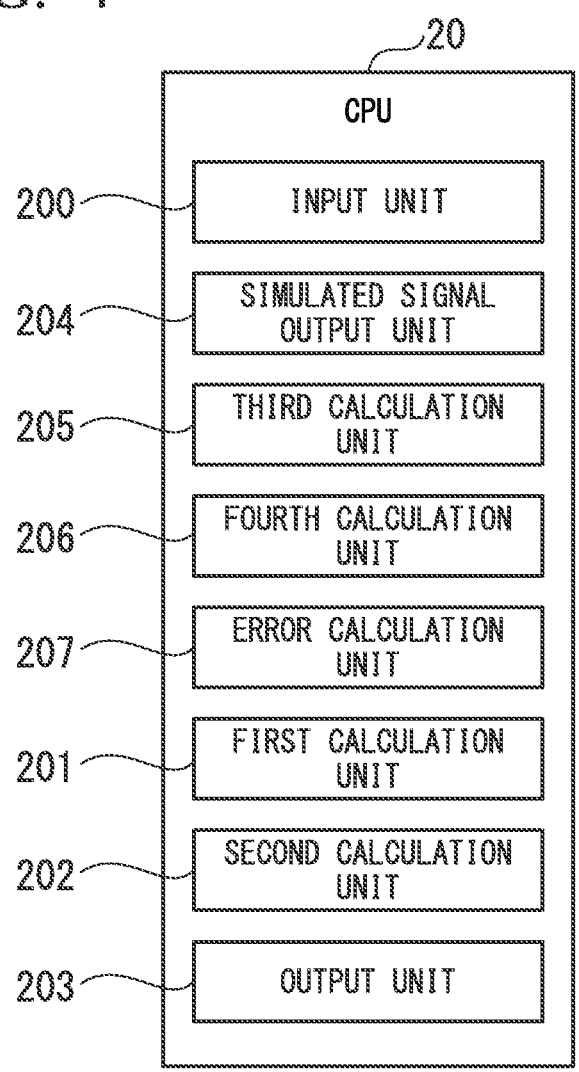
FIG. 4 is a diagram which shows a functional configuration of a control device according to a second embodiment.

FIG. 4 is a diagram which shows a functional configuration of the control device according to the second embodiment.

Only a software configuration of a control device 2 (CPU 20) is described in FIG. 4. As shown in FIG. 4, the CPU 20 according to the second embodiment also functions as a simulated signal output unit 204, a third calculation unit 205, a fourth calculation unit 206, and an error calculation unit 207 in addition to those in the configuration of the first embodiment (FIG. 2B). The first calculation unit 201, the second calculation unit 202, the error calculation unit 207, the third calculation unit 205, and the fourth calculation unit 206 may be realized as one calculation unit.

The simulated signal output unit 204 outputs a simulated signal ($\#y_0$) prepared in advance to simulate a behavior of the true value ($y_0$) of the target parameter. In the present embodiment, the simulated signal ($\#y_0$) may be recorded in the recording medium 24 in advance.

The third calculation unit 205 calculates a measurement value of a simulated variation amount (hereinafter, denoted as a simulated variation amount measurement value ($\#\Delta y^t$)) by adding a variation amount of noise ($\Delta w$) to the variation amount ($\#\Delta y_0$) of the simulated signal.

The fourth calculation unit 206 calculates a maximum likelihood estimate of a simulated variation amount (hereinafter, denoted as a simulated variation amount ($*\Delta y_0^t$) of the maximum likelihood estimate) by multiplying the simulated variation amount measurement value ($\#\Delta y^t$) calculated by the third calculation unit 205 by a predetermined estimation coefficient β (to be described below) based on a dispersion ($\sigma\Delta_{y0}^2$) of the variation amount of the simulated signal and a dispersion ($\sigma\Delta_w^2$) of the variation amount of noise. As described below, the fourth calculation unit 206 obtains a standard deviation ($\sigma\Delta_{y0}$) of the variation amount of the simulated signal from a product of a predetermined plurality of second adjustment coefficients ($\kappa_1, \kappa_2, \ldots$) and the simulated variation amount measurement value ($\#\Delta y^t$).

The error calculation unit 207 calculates an error $e^t$ between the simulated variation amount ($\#\Delta y_0^t$) of the maximum likelihood estimate and the variation amount ($*\Delta y_0^t$) of the simulated signal ($e^t = *\Delta y_0^t - \#\Delta y_0^t$). In addition, the error calculation unit 207 further specifies one of a plurality of second adjustment coefficients ($\kappa_1, \kappa_2, \ldots$) with which the error $e^t$ is minimized, and substitutes the specified second adjustment coefficient for the first adjustment coefficient (κ) used in step S2-2 of FIG. 3.

Notations of "#y" and "#Δy" in the specification correspond to a notation in which a tilde sign "~" is added to "y" in the following figures and equations. In the same manner, a notation of "#w" in the specification corresponds to a notation in which the tilde sign "~" is added to "w" in the following figures and equations.

(Processing Flow of Control Device)

Figure 5:
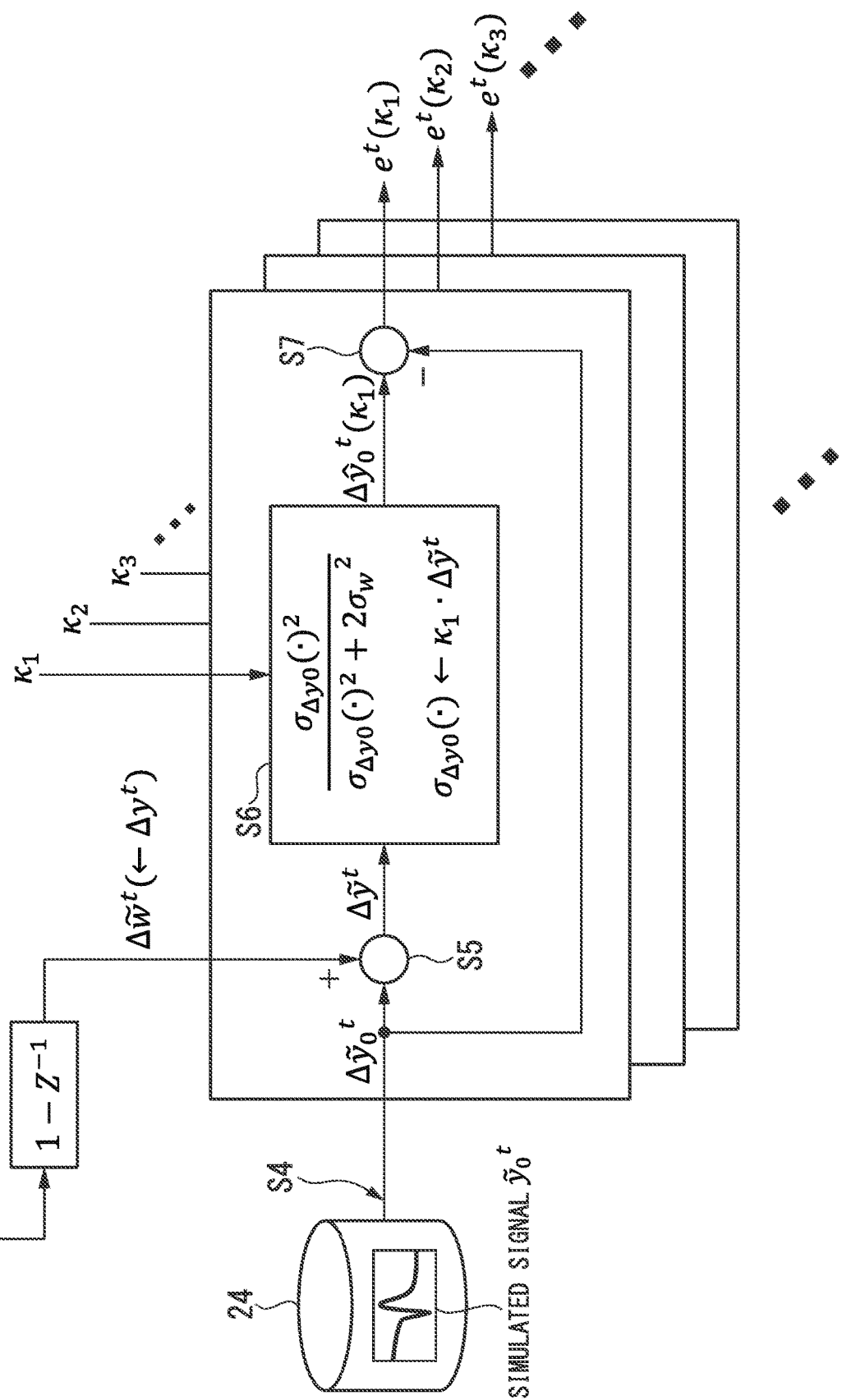
FIG. 5 is a first diagram which shows a processing flow of the control device according to the second embodiment.
Figure 6:
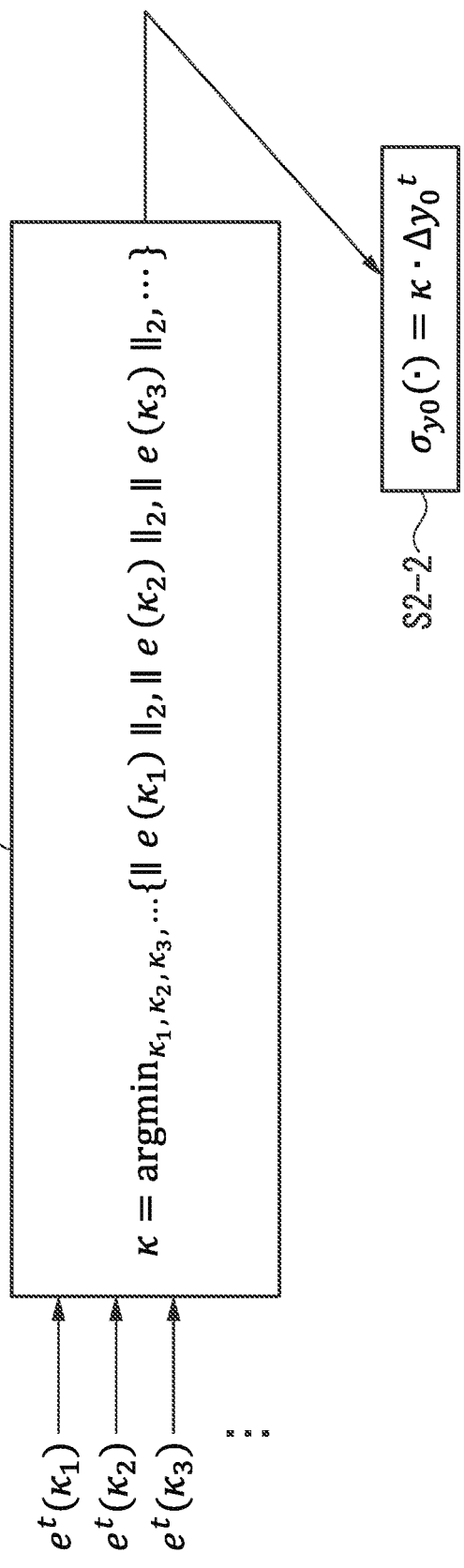
FIG. 6 is a second diagram which shows the processing flow of the control device according to the second embodiment.

FIGS. 5 and 6 are first and second diagrams which show processing flows according to the second embodiment, respectively.

The processing flows shown in FIGS. 5 and 6, in addition to the processing flow (FIG. 3) of the first embodiment, are also processing flows executed by the control device 2 to appropriately determine the first adjustment coefficient (κ) used in step S2-2.

As shown in FIG. 5, first the simulated signal output unit 204 of the control device 2 outputs the simulated signal ($\#y_0$) prepared in advance in the recording medium 24 (step S4). This simulated signal ($\#y_0$) is chronological data prepared in advance to simulate the behavior of the true value ($y_0$) of a target parameter to be observed (for example, the combustor outlet temperature of the gas turbine 1a) (that is, a statistical property of dynamic characteristics such as abnormality occurrence of the combustor outlet temperature).

The simulated signal output unit 204 sequentially outputs the simulated signal ($\#y_0$) prepared as chronological data for each corresponding time (time t, t+1, . . . ).

Next, the third calculation unit 205 of the control device 2 calculates the simulated variation amount measurement value ($\#\Delta y^t$) by adding the variation amount ($\#\Delta w^t$) of noise at a time t to the variation amount ($\#\Delta y_0^t$) of the simulated signal obtained from the simulated signal ($\#y_0^t$) output at the time tin step S4 (step S5).

Here, a physical significance of the simulated variation amount measurement value ($\#\Delta y^t = \#\Delta y_0^t + \#\Delta w^t$) calculated through step S5 is as follows. That is, when the simulated signal ($\#y_0^t$) at a certain time t is measured using the same system (a sensor installed in the gas turbine 1a) as the true value ($y_0$) of the target parameter, this measurement value ($y^t$) is obtained by superimposing the noise ($w^t$) on the simulated signal ($\#y_0^t$). In other words, the simulated variation amount measurement value ($\#\Delta y^t$) corresponds to a variation amount of the measurement value ($y^t$), which is obtained by superimposing the noise ($w^t$) on the simulated signal ($\#y_0^t$) as the true value ($y_0$), from the time t−1 to the time t.

In step S5, the third calculation unit 205 first subtracts the simulated signal ($\#y_0^{t-1}$) output at a previous time (the time t−1) from the simulated signal ($\#y_0^t$) output at a current time (the time t), thereby calculating the variation amount ($\#\Delta y_0^t$) of the simulated signal at the time t ($\#\Delta y_0^t = \#y_0^t - \#y_0^{t-1}$). In addition, the third calculation unit 205 replaces the variation amount ($\#\Delta w^t$) of noise at the time t with the variation amount ($\Delta y^t$) of the measurement value of the target parameter measured at the time t.

Here, the reason why the variation amount ($\Delta y^t$) of the measurement value of the target parameter measured at the time t can be substituted for the variation amount ($\#\Delta w^t$) of noise at the time t will be described. In other words, a sampling period of the sensor installed in the gas turbine 1a is generally designed to be much shorter than that of dynamic characteristics of the true value ($y_0$) of the target parameter. According to this property, the following equation (6) is established for an expected value.

$$\|y^t - y^{t-1}\|_2 \sim \|w^t - w^{t-1}\|_2 >> \|y_0^t - y_0^{t-1}\|_2 \qquad (6)$$

Equation (6) implies that a variation amount ($\#\Delta w$) of noise is usually dominant in the variation amount ($\Delta y$) of the measurement value of the target parameter. In such a case, the variation amount ($\#\Delta w$) of noise can be replaced with the variation amount ($\Delta y$) of the measurement value of the target parameter. Therefore, the third calculation unit 205 calculates a difference ($\Delta y^t = y^t - y^{t-1}$) at each time from the measurement value ($y$) of the target parameter sequentially input through the input unit 200, and regards the difference as the variation amount ($\#\Delta w^t$) of noise, thereby performing a calculation of step S5. That is, the simulated variation amount measurement value ($\#\Delta y^t$) is calculated according to Equation ($\#\Delta y^t = \#y_0^t + \#y^t$) in step S5.

Next, the fourth calculation unit 206 of the control device 2 calculates the simulated variation amount ($*\Delta y_0^t$) of the maximum likelihood estimate at the time t by multiplying the simulated variation amount measurement value ($\#\Delta y^t$) calculated in step S5 by the predetermined estimation coefficient β (to be described below) (step S6). Here, the simulated variation amount ($*\Delta y_0^t$) of the maximum likelihood estimate obtained by the calculation in step S6 is a maximum likelihood estimate of the variation amount ($\#\Delta y_0^t$) of the simulated signal occurring from the time t−1 to the time t.

The estimation coefficient β in step S6 is shown as in Equation (7) on the basis of the dispersion ($\sigma\Delta_{y0}^2$) of the variation amount of the simulated signal and the dispersion ($\sigma\Delta_w^2$) of the variation amount of noise.

$$\beta = \frac{\sigma_{\Delta y0}^2}{\sigma_{\Delta y0}^2 + 2\sigma_w^2} \quad (7)$$

Here, since the dispersion ($\sigma\Delta_w^2$) of the variation amount of noise is twice the dispersion ($\sigma_w^2$) of noise, ($\sigma\Delta_w^2$) is replaced with "$2\sigma_w^2$" in Equation (7) ($\sigma\Delta_w^2 = 2\sigma_w^2$).

The standard deviation ($\alpha\Delta_{y0}$) of the variation amount of the simulated signal in Equation (7) has the same property as the standard deviation ($\sigma_{y0}$) of the true value of the target parameter. As a result, in the same manner as the standard deviation ($\sigma_{y0}$) of the true value of the target parameter being expressed by the product of the first adjustment coefficient (κ) and the variation amount measurement value ($\Delta y^t$), the standard deviation ($\alpha\Delta_{y0}$) of the variation amount of the simulated signal is expressed by a product of a predetermined second adjustment coefficient ($\kappa_1, \kappa_2, \ldots$) and the simulated variation amount measurement value ($\#\Delta y^t$). That is, the fourth calculation unit 206 obtains the standard deviation ($\alpha\Delta_{y0}$) of the variation amount of the simulated signal by calculating a product of a second adjustment coefficient ($\kappa_1$) and the simulated variation amount measurement value ($\#\Delta y$) ($\sigma\Delta_{y0} = \kappa_1 \cdot \#\Delta y^t = \kappa_1 \cdot (\#\Delta y_0^t + \Delta y^t)$.) Here, each of the plurality of second adjustment coefficients ($\kappa_1, \kappa_2, \kappa_3 \ldots$) is a parameter prepared in advance as a candidate for the first adjustment coefficient (κ).

In step S6, the fourth calculation unit 206 calculates the simulated variation amount ($*\Delta y_0^t(\kappa_1), *\Delta y_0^t(\kappa_2), \ldots$) of the maximum likelihood estimate for each of the plurality of second adjustment coefficients ($\kappa_1, \kappa_2, \ldots$) by substituting each of the plurality of second adjustment coefficients ($\kappa_1, \kappa_2, \ldots$) into Equation (7).

Next, the error calculation unit 207 calculates an error $e^t$ between the simulated variation amount ($*\Delta y_0^t$) of the maximum likelihood estimate calculated in step S6 and the variation amount ($\#\Delta y_0^t$) of the simulated signal ($e^t = *\Delta y_0^t - \#\Delta y_0^t$) (step S7).

The error $e^t$ is a difference between the variation amount itself of the simulated signal corresponding to the true value and the variation amount (the maximum likelihood estimate of a simulated variation amount) subjected to maximum likelihood estimation through step S6. Therefore, it is possible to understand that accuracy of the maximum likelihood estimation performed in step S6 is improved when this error $e^t$ is smaller.

In step S7, the error calculation unit 207 calculates errors $e^t(\kappa_1), e^t(\kappa_2), e^t(\kappa_3), \ldots$, and so forth for each of the simulated variation amounts ($*\Delta y_0^t(\kappa_1), *\Delta y_0^t(\kappa_2), *\Delta y_0^t(\kappa_3), \ldots$) of the maximum likelihood estimate calculated for each of the plurality of second adjustment coefficients ($\kappa_1, \kappa_2, \ldots$).

The error calculation unit 207 specifies one of the plurality of second adjustment coefficients ($\kappa_1, \kappa_2, \ldots$) with which the errors $e^t(\kappa_1), e^t(\kappa_2), \ldots$, and so forth are minimized (step S8). Then, the error calculation unit 207 substitutes the second adjustment coefficient specified in step S8 for the first adjustment coefficient κ used in step S2-2 (refer to FIG. 6).

(Action/Effect)

As described above, the control device 2 according to the second embodiment prepares a simulated signal ($\#y_0$) which simulates a statistical property of the true value of the target parameter in advance, and at the same time calculates the error $e^t$ between the variation amount ($\#\Delta y_0$) of the simulated signal corresponding to the true value and the simulated maximum likelihood estimate ($*\Delta y_0$) of a variation amount. Then, the control device 2 determines a first adjustment coefficient κ with which the error $e^t$ is minimized among a plurality of candidates (the second adjustment coefficients ($\kappa_1, \kappa_2, \ldots$).

The first adjustment coefficient κ determined in this manner minimizes an error between the maximum likelihood estimate ($*\Delta y_0$) of a variation amount calculated in step S2-1 (FIG. 3) and the variation amount ($\Delta y_0$) of the true value which is an unknown value. Therefore, the accuracy of noise removal using the control device 2 is further improved.

The third calculation unit 205 according to the second embodiment calculates the simulated variation amount measurement value ($\#\Delta y^t$) by regarding the variation amount ($\Delta y^t$) of the measurement value of the target parameter as the variation amount ($\#\Delta w$) of noise (refer to step S5).

In this manner, it is possible to specify the variation amount ($\#\Delta w$) of noise from the variation amount ($\Delta y^t$) of the measurement value of the target parameter. Therefore, the simulated variation amount measurement value ($\#\Delta y^t$) corresponding to the variation amount measurement value ($\Delta y^t$) can be simply generated.

In other embodiments, the third calculation unit 205 is not limited to those in the embodiments described above. For example, the third calculation unit 205 according to other embodiments may acquire the variation amount ($\#\Delta w$) of noise in accordance with a normal distribution N (0,$\sigma\Delta_w$) of the noise (w) using a random number generation unit.

Moreover, it is described that the control device 2 controls the gas turbine 1a in the first embodiment, but the control device 2 is not limited to this mode in other embodiments. The control device 2 according to other embodiments may control a turbine device other than the gas turbine 1a (for example, a steam turbine), and may control devices, equipment, and facilities other than a turbine device (for example, a boiler, a reactor in chemical industrial plants, and the like).

In addition, κ in the error calculation unit 207 may be specified by methods such as a gradient method or a genetic algorithm (GA).

In the embodiments described above, the process of various types of processing of the control device 2 is stored in a computer-readable recording medium in a form of program. The various types of processing described above are performed by a computer reading and executing this program. In addition, the computer-readable recording medium refers to a magnetic disk, a magneto-optical disc, a CD-ROM, a DVD-ROM, a semiconductor memory, and the like. Moreover, this computer program may be delivered to a computer by a communication line, and the computer that receives this delivery may execute the program.

The program may be a program for realizing part of the functions described above. Furthermore, the program may also be a so-called difference file (a difference program) which can realize the functions described above in combination with a program already recorded in a computer system. Moreover, the control device 2 may be constituted by one computer or may be constituted by a plurality of computers connected to be able to communicate.

As described above, several embodiments according to the present invention have been described, but all of these embodiments are presented as examples and do not intend to limit a scope of the invention. These embodiments can be implemented in various other forms, and various omissions, substitutions, and changes can be made in a range not departing from the gist of the invention. These embodiments and modifications thereof are included in the invention described in the claims and the equivalent scope thereof as well as in the scope and gist of the invention.

What is claimed is:

1. A signal processing apparatus comprising a CPU configured to:
   receive an input of a measurement value of a target parameter at a first time, in which noise is superimposed on a true value of the target parameter;
   calculate a variation amount of the measurement value of the target parameter at the first time, based on a maximum likelihood estimate of the target parameter at a second time,
   which is before the first time, by subtracting a maximum likelihood estimate of the target parameter at the second time from the measurement value of the target parameter;
   calculate a maximum likelihood estimate of the variation amount by multiplying the variation amount by a coefficient, which is based on a dispersion of the true value of the target parameter and a dispersion of the measurement noise;
   output a value obtained by adding the maximum likelihood estimate of the variation amount to the maximum likelihood estimate of the target parameter at the second time as a maximum likelihood estimate of the target parameter at the first time;
   obtain the dispersion of the true value on the basis of a product of a predetermined first adjustment coefficient and the variation amount; and
   execute control of a device on the basis of the maximum likelihood estimate of the target parameter at the first time.

2. The signal processing apparatus according to claim 1,
   wherein the CPU further executes output of a simulated signal prepared in advance to simulate a behavior of the true value of the target parameter,
   wherein the CPU is configured to:
      calculate a measurement value of a simulated variation amount by adding a variation amount of the noise to a variation amount of the simulated signal;
      calculate a maximum likelihood estimate of the simulated variation amount by multiplying the measurement value of the simulated variation amount by a coefficient which is based on a dispersion of the variation amount of the simulated signal and a dispersion of the variation amount of the noise; and
      calculate an error between the variation amount of the simulated signal and the maximum likelihood estimate of the simulated variation amount,
   wherein the dispersion of the variation amount of the simulated signal is obtained on the basis of a product of a predetermined second adjustment coefficient and the measurement value of the simulated variation amount, and
   wherein a second adjustment coefficient with which the error becomes a minimum is specified among a plurality of second adjustment coefficients, and the specified second adjustment coefficient is substituted for the first adjustment coefficient.

3. The signal processing apparatus according to claim 2,
   wherein the CPU is configured to calculate the measurement value of the simulated variation amount by equating the variation amount of the measurement value of the target parameter to the variation amount of the noise.

4. The signal processing apparatus according to claim 1,
   wherein the CPU is configured to input the measurement value measured by a sensor installed in the device to be controlled by the input of the measurement value.

5. A turbine system comprising:
   the signal processing apparatus according to claim 1; and
   a turbine device,
   wherein the signal processing apparatus controls the turbine device on the basis of the maximum likelihood estimate of the target parameter at the first time.

6. A signal processing method comprising:
   receiving an input of a measurement value of a target parameter at a first time, in which noise is superimposed on a true value of the target parameter;
   calculating a variation amount of the measurement value of the target parameter at the first time, based on a maximum likelihood estimate of the target parameter at a second time, which is before the first time, by subtracting the maximum likelihood estimate of the target parameter at the second time from the measurement value of the target parameter;
   calculating a maximum likelihood estimate of the variation amount by multiplying the variation amount by a coefficient, which is based on a dispersion of the true value of the target parameter and a dispersion of the measurement noise;
   outputting a value obtained by adding the maximum likelihood estimate of the variation amount to the maximum likelihood estimate of the target parameter at the second time, as a maximum likelihood estimate of the target parameter at the first time; and
   executing control of a device on the basis of the maximum likelihood estimate of the target parameter at the first time,
   wherein the dispersion of the true value is obtained on the basis of a product of a predetermined first adjustment coefficient and the variation amount.

7. A non-transitory computer readable medium which stores a program causing a computer to execute:
   receiving an input of a measurement value of a target parameter at a first time, in which noise is superimposed on a true value of the target parameter;
   subtracting calculating a variation amount of the measurement value of the target parameter at the first time, based on a maximum likelihood estimate of the target parameter at a second time, which is before the first time, by subtracting the maximum likelihood estimate of the target parameter at the second time from the measurement value of the target parameter and a dispersion of the measurement noise;

calculating a maximum likelihood estimate of the variation amount by multiplying the variation amount by a coefficient, which is based on a dispersion of the true value of the target parameter and a dispersion of the measurement noise;

outputting a value obtained by adding the maximum likelihood estimate of the variation amount to the maximum likelihood estimate of the target parameter at the second time, as a maximum likelihood estimate of the target parameter at the first time; and executing control of a device on the basis of the maximum likelihood estimate of the target parameter at the first time, wherein the dispersion of the true value is obtained on the basis of a product of a predetermined first adjustment coefficient and the variation amount.

* * * * *